US011448280B2

(12) United States Patent
Ng et al.

(10) Patent No.: US 11,448,280 B2
(45) Date of Patent: Sep. 20, 2022

(54) BI-LINEAR ENERGY DISSIPATING AND SHOCK ABSORBING DEVICE FOR CABLE SUBJECTED TO TENSION

(71) Applicant: The Hong Kong University of Science and Technology, Hong Kong (CN)

(72) Inventors: Charles Wang Wai Ng, Hong Kong (CN); Clarence Edward Choi, Hong Kong (CN); Dongri Song, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 1143 days.

(21) Appl. No.: 15/781,673

(22) PCT Filed: Jan. 4, 2017

(86) PCT No.: PCT/CN2017/070127

§ 371 (c)(1),
(2) Date: Jun. 5, 2018

(87) PCT Pub. No.: WO2017/118376

PCT Pub. Date: Jul. 13, 2017

(65) Prior Publication Data

US 2018/0274618 A1 Sep. 27, 2018

Related U.S. Application Data

(60) Provisional application No. 62/387,524, filed on Jan. 5, 2016.

(51) Int. Cl.
*F16F 3/087* (2006.01)
*F16F 3/04* (2006.01)
(Continued)

(52) U.S. Cl.
CPC ................ *F16F 3/04* (2013.01); *E01F 7/045* (2013.01); *F16F 13/005* (2013.01); *F16F 15/04* (2013.01);
(Continued)

(58) Field of Classification Search
CPC .. F16F 1/128; F16F 3/04; F16F 13/005; F16F 15/04; F16F 15/13453; F16F 2228/08; F16F 2236/06; F16F 3/0876
See application file for complete search history.

(56) References Cited

U.S. PATENT DOCUMENTS 2,705,634 A 4/1955 Sampson et al.
10,149,991 B2 * 12/2018 Schurian .............. F16F 13/005
(Continued)

FOREIGN PATENT DOCUMENTS

CN 101514731 A 8/2009
CN 104045007 A 9/2014
(Continued)

OTHER PUBLICATIONS

International Search Report issued in PCT/CN2017/070127 dated Apr. 12, 2017 (2 pages).
(Continued)

*Primary Examiner* — Thomas W Irvin
(74) *Attorney, Agent, or Firm* — Osha Bergman Watanabe & Burton LLP

(57) ABSTRACT

A device (1) comprises: a cylindrical shell (4); a first spring (5) encased inside the cylindrical shell (4); a second spring (6) encased inside the cylindrical shell (4); a separator (13) in the cylindrical shell (4) separating the first and second springs (5, 6); a first end plate (12) on a first side (13*a*) of the separator (13) and a second end plate (11) on a second side (13*b*) of the separator (13); a first rod (2) and a second rod (3) passing openings (20*a*, 20*b*) provided at each end of
(Continued)

the cylindrical shell (4), with the first rod (2) connected to the first end plate (12) and the second rod (3) connected to the second end plate (11); and a spacer (14) inserted between the first end plate (12) and the first spring (5).

17 Claims, 7 Drawing Sheets

(51) Int. Cl.

| | |
|---|---|
| ***F16F 13/00*** | (2006.01) |
| ***E01F 7/04*** | (2006.01) |
| ***F16F 15/04*** | (2006.01) |

(52) U.S. Cl.

CPC ....... *F16F 2228/08* (2013.01); *F16F 2236/06* (2013.01)

(56) References Cited

U.S. PATENT DOCUMENTS

| | | | | |
|---|---|---|---|---|
| 10,443,677 | B2 * | 10/2019 | Hattori | E04B 1/98 |
| 10,473,175 | B1 * | 11/2019 | Wild | F16F 1/128 |
| 11,014,473 | B2 * | 5/2021 | Fillep | B60N 2/1625 |
| 11,090,518 | B2 * | 8/2021 | Carroccia | F16F 13/005 |
| 2011/0278778 | A1 * | 11/2011 | Qattan | F16F 3/00<br>267/171 |
| 2018/0283487 | A1 * | 10/2018 | Hattori | F16F 3/02 |
| 2020/0001750 | A1 * | 1/2020 | Fillep | B60N 2/1625 |
| 2020/0171333 | A1 * | 6/2020 | Carroccia | F16F 1/128 |
| 2020/0318368 | A1 * | 10/2020 | Mesner | E04G 21/26 |

FOREIGN PATENT DOCUMENTS

| | | | |
|---|---|---|---|
| CN | 104335698 | B | 2/2015 |
| CN | 205295975 | U | 6/2016 |
| FR | 1039317 | A | 10/1953 |

OTHER PUBLICATIONS

Written Opinion issued in PCT/CN2017/070127 dated Apr. 12, 2017 (3 pages).

Office Action issued in Chinese Application No. 201780005762.2 dated Aug. 22, 2019 (18 pages).

* cited by examiner

FIG 1 System

BI-LINEAR ENERGY DISSIPATING AND SHOCK ABSORBING DEVICE FOR CABLE SUBJECTED TO TENSION

CROSS-REFERENCE TO RELATED APPLICATION

This application claims priority under 35 USC § 119 to U.S. Provisional Application Ser. No. 62/387,524 filed on Jan. 5, 2016. U.S. Provisional Application Ser. No. 62/387, 524 is hereby incorporated in its entirety.

BACKGROUND

For geotechnical and geological engineering applications, a flexible barrier may be used to intercept debris flow and rockfall, and also used for snow avalanche protection. An exemplary system is shown in FIG. 1 that includes a flexible barrier system (100) which relies on a series of complex interaction between structural components to attenuate impact energy induced by debris flow, rockfall, and snow avalanche in mountainous regions. These structural components may include posts (102), a net (104), horizontal cable (106), retaining cables (108), and energy dissipating devices (110). Horizontal cables are used to hang the net to the two posts with each end of the horizontal cable connected to a post. The retaining cables are used to secure the posts to the ground with one end connected to the post and the other end connected to the ground. The energy dissipating devices are placed in the horizontal and retaining cables to control the absorption of the impact energy in a flexible barrier system.

There exist several proprietary energy dissipating devices, most notably brake-ring and U-shaped devices. The functionality of these energy dissipating devices relies on similar principles. The horizontal or retaining cables are passed through a metal tube bent in a shape of a ring or U-shape. The ends of the tube are clamped together using a compression sleeve. As the cable is loaded, the ring or U-shaped tube deform plastically in the direction guided by the compression sleeve. The plastic deformation and friction from the compression sleeve are principal for transforming impact energy into heat loss and dissipating energy.

The loading behavior of these proprietary energy dissipating devices are strongly influenced by workmanship, such as how tightly the compression sleeve has been clamped on to the tubes. As a result, large variability in loading behavior of the same type of energy dissipating devices has been observed owing to workmanship. The lack of repeatability in loading behavior of proprietary energy dissipating devices forces engineers to include redundancies in their designs to compensate for this problem. Once these proprietary energy dissipating devices have been loaded by a debris flow, rock fall, and snow avalanche, irreversible strains occur and the proprietary devices cannot be reused. The working principle of proprietary dissipating devices relies on complex non-linear plastic deformation to generate heat loss. Given the complexity of the non-linear plastic deformation, it is not easy for engineers to predict and control the loading behavior of these proprietary devices.

There exists a need for an alternative to the proprietary energy dissipating devices that are reusable and provide predictable energy dissipation.

SUMMARY

In general, in one aspect, the embodiments relate to a device, comprising: a cylindrical shell; a first spring encased inside the cylindrical shell; a second spring encased inside the cylindrical shell; a separator in the cylindrical shell separating the first and second springs; a first end plate on a first side of the separator and a second end plate on a second side of the separator; a first rod and a second rod passing openings provided at each end of the cylindrical shell, with the first rod connected to the first end plate and the second rod connected to the second end plate; and a spacer inserted between the first end plate and the first spring.

In general, in one aspect, the embodiments relate to a method for configuring an energy dissipating device, comprising: providing a cylindrical shell; providing a first spring encased inside the cylindrical shell; providing a second spring encased inside the cylindrical shell; placing a separator in the cylindrical shell separating the first and second springs; providing a first end plate on a first side of the separator and a second end plate on a second side of the separator; providing a first rod and a second rod passing openings provided at each end of the cylindrical shell, with the first rod connected to the first end plate and the second rod connected to the second end plate; and placing a spacer inserted between the first end plate and the first spring.

In general, in one aspect, the embodiments relate to a system, comprising: a net; two posts spaced apart; horizontal cables hanging the net to the two posts with each end of the horizontal cable connected to a post; retaining cables with one end connected to the post and the other end connected to ground; and at least one energy dissipating devices placed in the retaining cables, the energy dissipating device including: a cylindrical shell; a first spring encased inside the cylindrical shell; a second spring encased inside the cylindrical shell; a separator in the cylindrical shell separating the first and second springs; a first end plate on a first side of the separator and a second end plate on a second side of the separator; a first rod and a second rod passing openings provided at each end of the cylindrical shell, with the first rod connected to the first end plate and the second rod connected to the second end plate; and a spacer inserted between the first end plate and the first spring.

Other aspects of the technology will be apparent from the following description and the appended claims.

DETAILED DESCRIPTION

Figure 1:
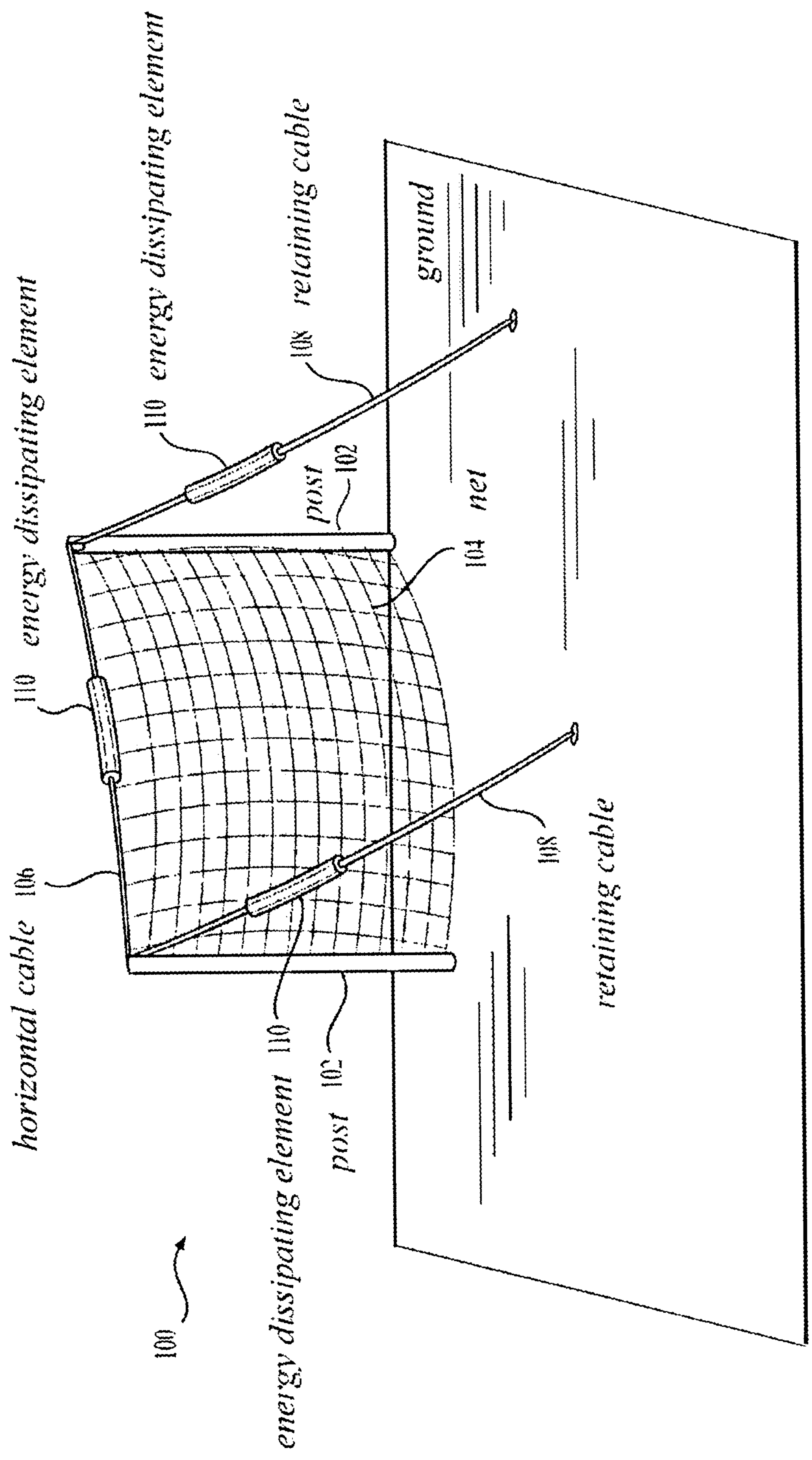
FIG. 1 shows an exemplary system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term approximately is used to indicate within standard engineering tolerances within the art, for example, plus or minus 1%, 5%, and 10% or more depending on the specific context discussed herein.

In one or more embodiments of the technology, a bi-linear energy dissipating and shock absorbing device is used as the energy dissipating device to absorb impact. More specifically, the bi-linear energy dissipating and shock absorbing device for a cable subjected to tension relies on the elastic behavior of springs to develop a repeatable and fully specifiable bi-linear loading behavior to absorb impact, e.g., impact of debris flow, rockfall, and snow avalanche.

The embodiment of this technology absorbs shock and energy through elastic deformation instead of irreversible plastic strain. A combination of the elastic springs and preloading ensures the bi-linear behavior of the device is as efficient as conventional energy dissipating devices that rely on plastic deformation. Compared with existing products, this device has fully specifiable loading behavior that can be reused after a loading event. Furthermore, the loading behavior is repeatable and predictable.

In general, embodiments of the technology relate to a major component of flexible barriers, that is a device for bi-linear energy dissipating. Specifically, the device includes two elastic springs with different stiffness encased within a cylindrical shell. One spring is preloaded while the other is relaxed. Under tension, only the relaxed spring is compressed before the preload force is reached. After the preload force has been reached, a transition in stiffness develops. The device results in a bi-linear load displacement path and can effectively attenuate energy induced from tensile loading.

More specifically, by adopting a two-spring mechanism to achieve a bi-linear loading behavior, the device absorbs shock and energy through elastic deformation. By combining the two-spring mechanism with a preloading mechanism, the device is as efficient as proprietary energy dissipating devices. Further, the device has fully specifiable loading behaviors and higher repeatability and reusability over proprietary energy dissipating devices.

Figure 2:
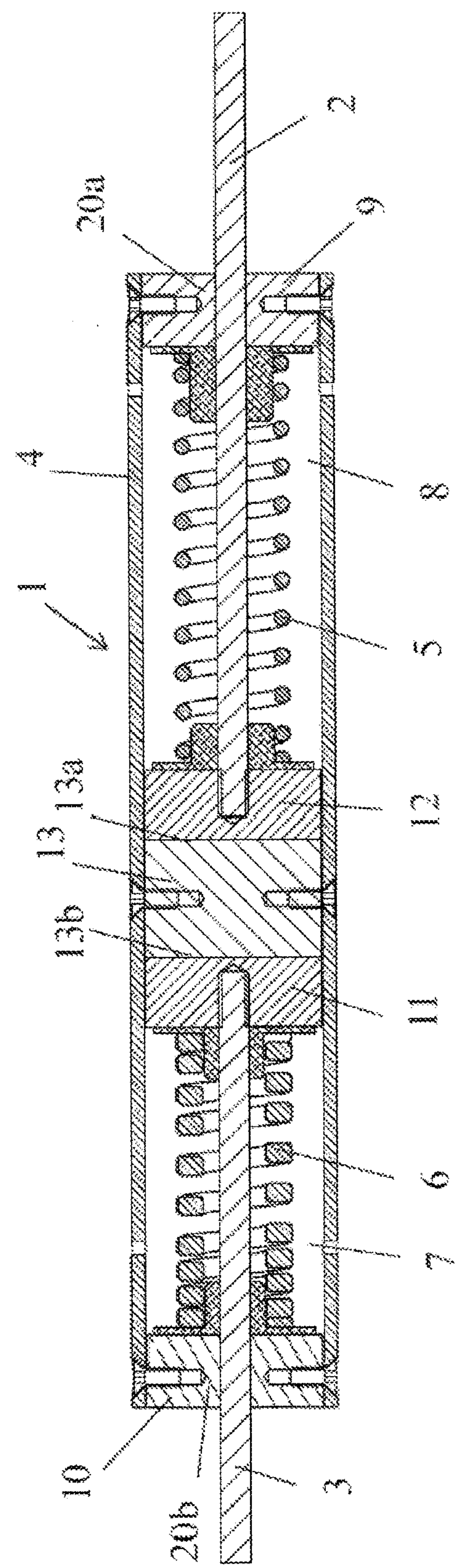
FIG. 2 shows a longitudinal section through an exemplary device in initial state in accordance with one or more embodiments of the technology.

FIG. 2 shows a longitudinal section through an exemplary device in initial state in accordance with one or more embodiments of the technology.

As shown in FIG. 2, a stiffer spring 6 and a softer spring 5 are encased inside a cylindrical shell 4 of device 1. The ratio of the softer spring 5 stiffness and the stiffer spring 6 stiffness is approximately 0.05-0.2. The two springs 5 and 6 are separated within their own chambers 8 and 7 respectively, using a fixed separator 13. Rods 2 and 3 pass openings 20*a* and 20*b* at each end of the cylindrical shell 4 and the ends of the rods 2 and 3 are connected to end plates 12 and 11. The end plate 12 is on a first side 13*a* of the separator 13, and the end plate 11 is on a second side 13*b* of the separator 13. Each spring rests against an end plate 11 and 12 and the ends 10 and 9, respectively, of the cylindrical shell 4.

Figure 3:
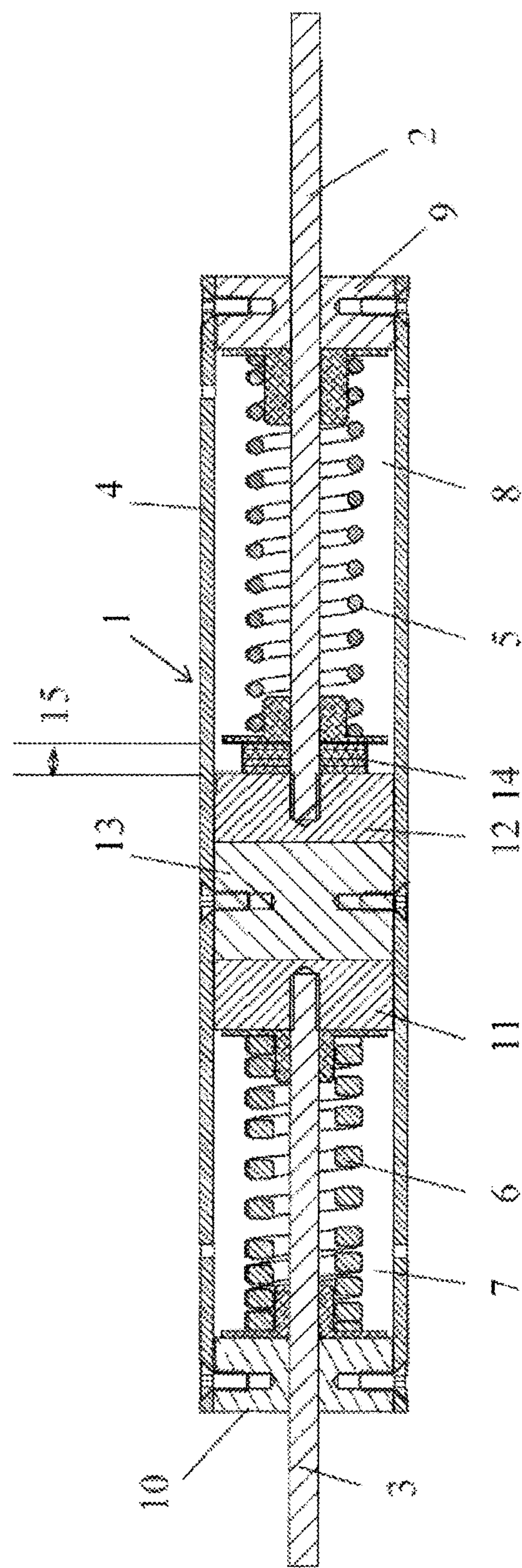
FIG. 3 shows a longitudinal section through an exemplary device preloaded by a spacer in accordance with one or more embodiments of the technology.
Figure 6:
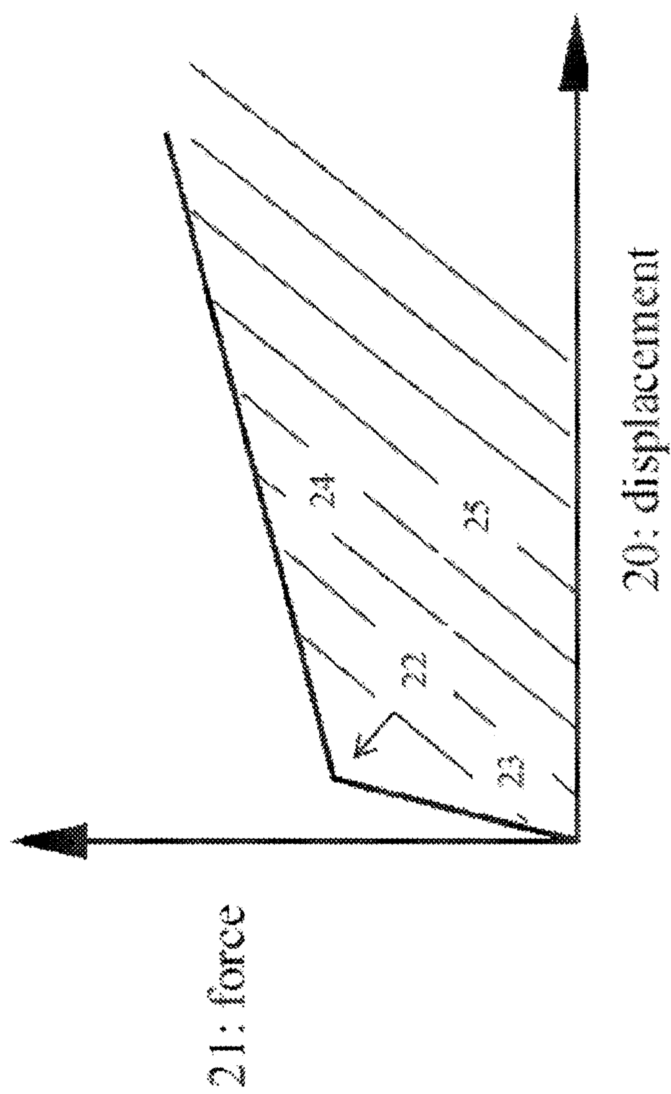
FIG. 6 shows a braking force/braking path diagram in accordance with one or more embodiments of the technology.

In combination with the devices described in FIG. 2 and FIG. 6, FIG. 3 shows a longitudinal section through an exemplary device internal preloaded by a spacer in accordance with one or more embodiments of the technology. As shown in FIG. 3, spring 5 is preloaded to load 22, as illustrated in FIG. 6 and referred to as preload force 22 herein, by inserting a spacer 14 of a pre-specified displacement 15 between the end plate and spring 5. The pre-specified displacement 15 is determined as the ratio between the preload force 22 and the stiffness of spring 5.

Figure 4:
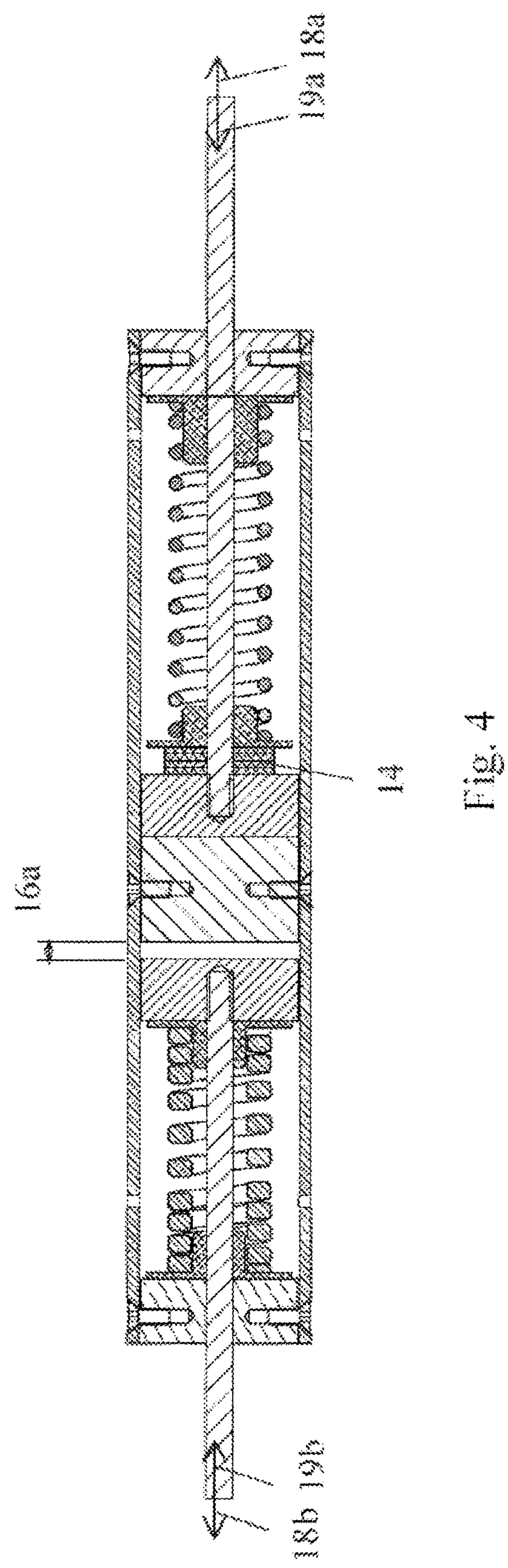
FIG. 4 shows a longitudinal section through an exemplary device subjected to external tensile forces less than or equal to the preload force in accordance with one or more embodiments of the technology.

FIG. 4 shows a longitudinal section through an exemplary device subjected to external tensile forces less than or equal to the preload force in accordance with one or more embodiments of the technology.

If tensile forces 18*a* and 18*b* applied to rods 2 and 3 are less than or equal to preload force 22, then only spring 6 becomes externally loaded by displacement 16*a* at stiffness 23 (as illustrated in FIG. 6). Spring 6 produces braking forces 19*a* and 19*b* in the opposite direction of the applied tensile forces 18*a* and 18*b*. The purpose of high initial stiffness is to prevent large deformation induced by small disturbances.

Figure 5:
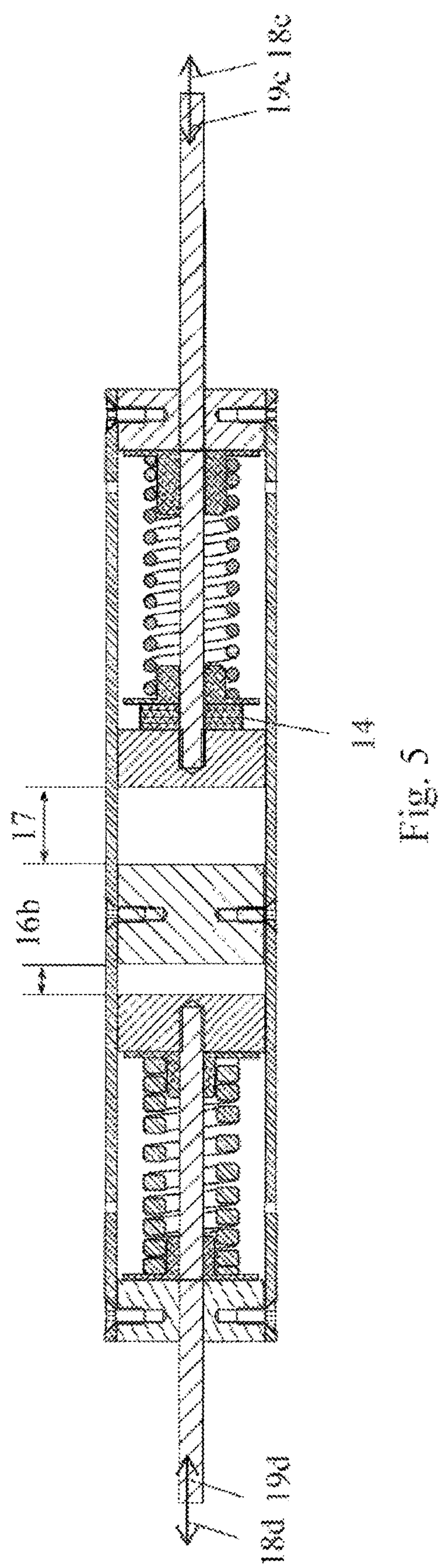
FIG. 5 shows a longitudinal section through an exemplary device subjected to external tensile forces larger than the preload force in accordance with one or more embodiments of the technology.

FIG. 5 shows a longitudinal section through an exemplary device subjected to external tensile forces larger than the preload force in accordance with one or more embodiments of the technology.

Once the applied tensile forces 18*c* and 18*d* exceed preload force 22, then both springs 5 and 6 act in series and result in displacements 17 and 16*b*, and the device is loaded at a stiffness of 24 (as illustrated in FIG. 6), which is the second stage stiffness. By displacing both springs, the device produces braking forces 19*c* and 19*d* in the opposite direction of the applied tensile forces 18*c* and 18*d*. The fundamental mechanism of device 1 is to attenuate the impulse load and absorb the kinematic energy of impact or shock. Device 1 has attenuated the impulse load by activating spring 5 after the preload force 22 is reached. In one or more embodiments of the technology, the initial and second stage stiffness achieves bi-linear loading behavior. And the device results in a bi-linear load displacement path. The initial and second stage stiffness are both adjustable by changing springs with different stiffness. Also, the transition point (preload force) is adjustable by changing the thickness of the spacer. So the device has fully specifiable loading behavior and the embodiment of adjustable stiffness can be specified to adapt to different required energy absorption capacity.

Returning to FIG. 6, this figure shows an exemplary braking force/braking path diagram in accordance with one or more embodiments of the technology. FIG. 6 shows the development diagram of the braking force 21 over path displacement 20 when device 1 is stressed in accordance with the previously described FIGS. 1-5. The device is preloaded to preload force 22 by inserting the spacer 14. The loading behavior initially exhibits a steep increase in load (stiffness 23) of the braking force until the preload force 22 is reached, after which the braking force loads in a more progressive manner (stiffness 24). It is a combination of softer and stiffer stiffness. The area below the load-displacement curve characterizes the energy 25 dissipated from the loading process.

One skilled in the art will recognize that the architecture of the system is not limited to the components shown in FIGS. 1-6, and that the system may be modified in response to engineering requirement or to employ other devices having equivalent functionality.

Figure 7:
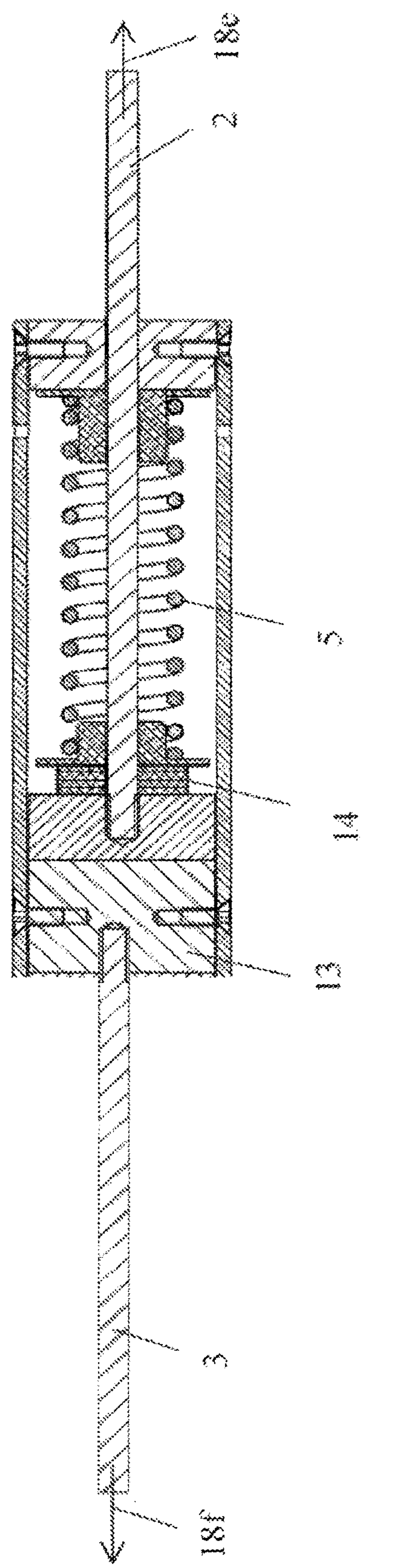
FIG. 7 shows a longitudinal section through an exemplary device with a single spring in accordance with one or more embodiments of the technology.

FIG. 7 shows a longitudinal section through an exemplary device with a single spring in accordance with one or more embodiments of the technology.

In the case of a single spring, the device 1 includes one spring 5 preloaded by spacer 14. Rod 3 is directly fixed on separator 13, while chamber 7 and other components within chamber 7 are removed as illustrated, for example, in FIG. 2. In this embodiment, when the tensile forces 18*e* and 18*f* applied to rods 2 and 3 are less than or equal to preload force 22, then spring 5 does not become externally loaded. When the tensile forces 18*e* and 18*f* applied to rods 2 and 3 are larger than preload force 22, then spring 5 becomes loaded. Since there is no displacement before tensile forces 18*e* and 18*f* reach preload force 22, the initial stiffness 23 becomes infinite. This preloaded single spring is a special case of the aforementioned embodiment with two springs.

While the technology has been described with respect to a limited number of embodiments, those skilled in the art, having benefit of this disclosure, will now appreciate that other embodiments can be devised which do not depart from the scope of the technology as disclosed herein.

What is claimed is:

1. A device, comprising:

a cylindrical shell;

a first spring encased inside the cylindrical shell;

a second spring encased inside the cylindrical shell;

a separator in the cylindrical shell separating the first and second springs;

a first end plate on a first side of the separator and a second end plate on a second side of the separator;

a first rod and a second rod passing openings provided at each end of the cylindrical shell, with the first rod connected to the first end plate and the second rod connected to the second end plate; and a spacer inserted between the first end plate and the first spring, wherein the first spring has a smaller stiffness and the second spring has a larger stiffness, wherein the ratio of the smaller stiffness and the larger stiffness is approximately 0.05-0.2.

2. The device of claim 1, wherein the first spring is preloaded with a preload force by placing the spacer resulting in a pre-specified displacement.

3. The device of claim 2, wherein when external tensile forces are applied on the first and the second rods, the external forces are less than or equal to the preload force, second spring becomes externally loaded by a first displacement;

the external forces are larger than the preload force, first spring becomes externally loaded by a second displacement, and the second spring becomes externally loaded by a third displacement.

4. The device of claim 2, wherein the preloaded force is adjustable by changing the thickness of the spacer.

5. The device of claim 1, wherein the stiffness of first spring and second spring is adjustable.

6. The device of claim 1, wherein the device is configured to absorb shock and store energy through elastic deformation and can be reused after each loading event.

7. The device of claim 1 results in a bi-linear load displacement path.

8. The device of claim 1 has fully specifiable loading behavior.

9. A method for configuring an energy dissipating device, comprising:

providing a cylindrical shell;

providing a first spring encased inside the cylindrical shell; providing a second spring encased inside the cylindrical shell;

placing a separator in the cylindrical shell separating the first and second springs;

providing a first end plate on a first side of the separator and a second end plate on a second side of the separator;

providing a first rod and a second rod passing openings provided at each end of the cylindrical shell, with the first rod connected to the first end plate and the second rod connected to the second end plate; and placing a spacer inserted between the first end plate and the first spring, wherein the first spring has a smaller stiffness and the second spring has a larger stiffness, wherein the ratio of the smaller stiffness and the larger stiffness is approximately 0.05-0.2.

10. The method of claim 9, wherein the first spring is preloaded with a preload force by placing a spacer resulting in a pre-specified displacement.

11. The method of claim 10, wherein when external tensile forces are applied on the first and the second rods, the external forces are less than or equal to the preload force, second spring becomes externally loaded by a first displacement;

the external forces are larger than the preload force, first spring becomes externally loaded by a second displacement, and the second spring becomes externally loaded by a third displacement.

12. The method of claim 10, wherein the preload force is adjustable by changing the thickness of the spacer.

13. The method of claim 9, further comprising adjusting a stiffness of the device via changing the first and second spring with springs of different stiffnesses.

14. The method of claim 9, wherein the device is configured to absorb shock and stores energy through elastic deformation and can be reused after each loading event.

15. The method of claim 9 results in a bi-linear load displacement path.

16. The method of claim 9 has fully specifiable loading behavior.

17. A system, comprising:

a net;

two posts spaced apart;

horizontal cables hanging the net to the two posts with each end of the horizontal cable connected to a post;

retaining cables with one end connected to the post and the other end connected to ground; and at least one energy dissipating devices installed on the retaining cables, the energy dissipating device including:

a cylindrical shell;

a first spring encased inside the cylindrical shell;

a second spring encased inside the cylindrical shell;

a separator in the cylindrical shell separating the first and second springs;

a first end plate on a first side of the separator and a second end plate on a second side of the separator;

a first rod and a second rod passing openings provided at each end of the cylindrical shell, with the first rod connected to the first end plate and the second rod connected to the second end plate; and a spacer inserted between the first end plate and the first spring, wherein the first spring has a smaller stiffness and the second spring has a larger stiffness, wherein the ratio of the smaller stiffness and the larger stiffness is approximately 0.05-0.2.

* * * * *